US007554274B2

(12) United States Patent

Wang et al.

(10) Patent No.: US 7,554,274 B2

(45) Date of Patent: Jun. 30, 2009

(54) SYSTEM AND METHOD FOR LIGHTING CONTROL NETWORK RECOVERY FROM MASTER FAILURE

(75) Inventors: Ling Wang, Millwood, NY (US); Demetri J. Giannopoulos, Norwalk, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 779 days.

(21) Appl. No.: 10/538,605

(22) PCT Filed: Dec. 8, 2003

(86) PCT No.: PCT/IB03/05927

§ 371 (c)(1),
(2), (4) Date: Jun. 10, 2005

(87) PCT Pub. No.: WO2004/056157

PCT Pub. Date: Jul. 1, 2004

(65) Prior Publication Data

US 2006/0244624 A1 Nov. 2, 2006

Related U.S. Application Data

(60) Provisional application No. 60/433,750, filed on Dec. 16, 2002.

(51) Int. Cl.
*H05B 41/00* (2006.01)
*H02J 3/14* (2006.01)

(52) U.S. Cl. .......................... 315/317; 315/321; 307/40

(58) Field of Classification Search ................. 315/291, 315/307, 312, 314, 315, 316, 318, 321, DIG. 4; 307/38, 39, 40
See application file for complete search history.

(56) References Cited

U.S. PATENT DOCUMENTS

| | | | | | |
|---|---|---|---|---|---|
| 5,811,942 | A | * | 9/1998 | Pedretti | 315/312 |
| 5,838,116 | A | * | 11/1998 | Katyl et al. | 315/307 |
| 5,848,054 | A | | 12/1998 | Mosebrook | |
| 6,008,593 | A | | 12/1999 | Ribarich | |
| 6,157,093 | A | * | 12/2000 | Giannopoulos et al. | 307/38 |
| 6,160,795 | A | * | 12/2000 | Hosemann | 370/256 |
| 6,174,073 | B1 | | 1/2001 | Regan | |
| 6,253,335 | B1 | | 6/2001 | Nakajima | |
| 6,388,396 | B1 | | 5/2002 | Katyl | |
| 6,400,103 | B1 | * | 6/2002 | Adamson | 315/292 |
| 7,190,686 | B1 | * | 3/2007 | Beals | 370/337 |
| 2002/0173321 | A1 | * | 11/2002 | Marsden et al. | 455/500 |

FOREIGN PATENT DOCUMENTS

| | | | |
|---|---|---|---|
| EP | 0525 133 | B1 | 2/1993 |
| EP | 1 176 762 | A1 | 1/2002 |
| JP | 10126861 | | 5/1998 |

* cited by examiner

*Primary Examiner*—Douglas W Owens
*Assistant Examiner*—Minh D A

(57) ABSTRACT

The present invention provides a master-slave architecture for a radio frequency RF networked lighting control system having all slave elements (ballasts) configured as backups for a network master control unit. In the system and method of the present invention a slave element can become the network master network unit without reconfiguring the network and without any human intervention. Similarly, both a master and one or more slave elements may recover from a temporary outage without necessitating reconfiguration of the network and without any human intervention.

20 Claims, 3 Drawing Sheets

SYSTEM AND METHOD FOR LIGHTING CONTROL NETWORK RECOVERY FROM MASTER FAILURE

CROSS REFERENCE TO RELATED APPLICATION

This application claims the benefit of U.S. provisional application Ser. No. 60/433,750 filed Dec. 16, 2002, which is incorporated herein by reference.

BACKGROUND OF THE INVENTION

1. Field of the Invention

This invention is related to recovering the ballast control in a wireless lighting control network when the main controller (master) fails. More particularly, this invention is related to a wireless lighting control network system and method in which all lighting ballasts act as backups for a network master control unit. Most particularly, this invention is related to a system and method for a master-slave architecture for a wireless lighting control network that include all lighting ballasts as backup for a network master control unit such that there is no need for reconfiguration of the network or human intervention when a master fails or functioning of the master or slave ballasts is interrupted.

2. Description of Related Art

Traditional lighting has wall switches wired to the ballasts individually or in groups. If one of the switches fails, the ballasts that are controlled by other switches won't be affected. In wireless control, the on/off or light intensity is controlled by the signals transmitted from a remote table-top or handheld control unit via infra-red (IR) or radio frequency (RF) communication media.

There are basically two types of system configurations in wireless control. One is a distributed system that has several remote control units, each remote unit controlling a certain number of ballasts through the wireless links. The ballasts obtain the IDs of their designated controllers during the initialization of the system. Then, during normal operation the ballasts "listen" and react to the lamp operational signals coming transmitted by these controllers. The systems described in U.S. Pat. No. 5,848,054 to Mosebrook et al. and U.S. Pat. No. 6,174,073 to Regan, fall into this category.

The other type of system is a master-slave oriented networked architecture, which is the focus of this invention. There is one central device, so called "master" or "network coordinator" that manages communication among the network nodes. The ballasts and the remote controls both act as the slaves in the network. All the information about the wireless links between the keys on the remote control and the ballasts is gathered in a table stored in the master during initial configuration of the system. During the normal operation, the signal transmitted by a remote control is routed to its destination ballast by the master based on the link information in the table. The physical form of the master can be the same as a slave device, i.e. the master can reside in the remote control or the ballast. It is preferable to put the master in the ballast as it is mains-powered and at a fixed location. Connecting to the mains allows the master to transmit beacon packets that contain the master status information as a way to keep the slaves in touch every once in a while. Being at a fixed location avoids problems a missing handheld remote control since all the network information is lost in such a case.

The master-slave networked system has the following advantages over the distributed system:

If more than one remote-control is needed in a multi-zone office, a separate master is essential for network recovery if a remote control is lost.

A master-slave architecture centralizes the control information for the local network and makes it easier to form the building-wide network.

In both wireless systems, there could be several reasons for a system failure:

Power Loss: In normal operation, the ballasts should not be cut off from the mains power for any reason, as they have to keep the RF communication alive all the time. Turning-off the lamps only puts the lamp-drivers in stand-by in digital ballasts, and it does not shut off the power supply to the circuits. Sometimes the controller that happens to be installed on a different mains power line from the ballasts experiences a power outage. Other times the controller could be running out of battery if battery powered.

Circuit malfunction: This includes circuit failures in the master control unit (MCU) or RF transceiver, and the temporary RF signal blockage/shielding or interference such that the communications between the devices are blocked.

Master Control Unit Failure: In a wireless network the master control unit represents a single point of failure. That is, once the master fails, all link information kept only by the master is lost. In a point-to-point network the network is no longer operable. This also occurs because the master routes all the packets and the master fails.

There are several ways to enhance the reliability. The wireless system taught by U.S. Pat. No. 5,848,054 to Mosebrook et al., increases the reliability communications by adding repeaters between the source and destination devices. When the master and the ballasts suffer from intermittent communication in the direct path due to distance or RF interference, a repeater provides an additional communication path. However, this does not solve the problem of the master going completely dead.

Another system, taught by EP0525133 to Edwards et al., solves the master power outage problem by providing a battery as a back-up power source. When AC power is available, the battery is being charged. When the AC is cut off, the power supply automatically switches to the battery. Even though this idea teaches a battery backup for conventional hardwired lighting systems, it can be applied to the wireless system too. However, it can be costly to provide an additional power supply to every control device.

In a master-slave networked system, due to the important role of the master, it is critical to make sure that there is always a master working properly at all times. If the controller fails due to a power outage (dead battery) or malfunction, the problem arises of to how to regain controls of the ballasts. New replacements can be brought in, but the configuration, such as which key to control which ballasts, has to be set up again since there is no hardwiring in a wireless control system. Depending on how the wireless control network is built in the first place, sometimes this may mean starting the configuration from scratch all over again.

SUMMARY OF THE INVENTION

The present invention solves the problems associated with a single master, as discussed above, by providing multiple back-up masters in a master-slave orientated control network. The system and method of the present invention enhances system reliability without an extra device or costly circuitry. Each ballast in the network has the potential to be a master when needed. This means each device needs a little bit of extra memory to store the master program. In a digital ballast, the cost for additional memory is minimal.

The master malfunction is automatically detected by the slaves in the network. Once a master fails, a back-up master takes control of the network following a pre-established protocol or algorithm of a preferred embodiment. The network recovery takes place automatically and is transparent to the end user. There is no need to set up the network control configuration again.

The original master resides in one of the ballasts after the installation and configuration of the network, which includes the physical installation, registration of the ballasts with the network master (so called "enumeration"), and associating the ballasts with certain buttons on the remote control (so called "binding").

All the ballasts (slaves in the network) have the possibility and capability of becoming the new master if needed. It is randomly decided, when necessary, which ballast is the next back-up master. There is no priority number assigned before hand.

DESCRIPTION OF PREFERRED EMBODIMENTS

The wireless lighting control network functions analogously to a wireless communication network. The lighting network itself is identified by a network ID, which is the essential information for communication among all the network nodes and there is a several layer communication protocol stack associated with every component of the wireless lighting network. After the network is established by the master and an enumeration of the lighting elements and pairing of enumerated lighting elements with keys are done, the master has all the pairing information stored in a pairing-link table in the protocol stack. Each pairing-link table entry specifies which ballast(s) reacts to which key and on which remote control. The master transfers this pairing-link table to all the slaves in the network. Every time the pairing-link table is changed, the master keeps all the slaves updated.

Figure 1:
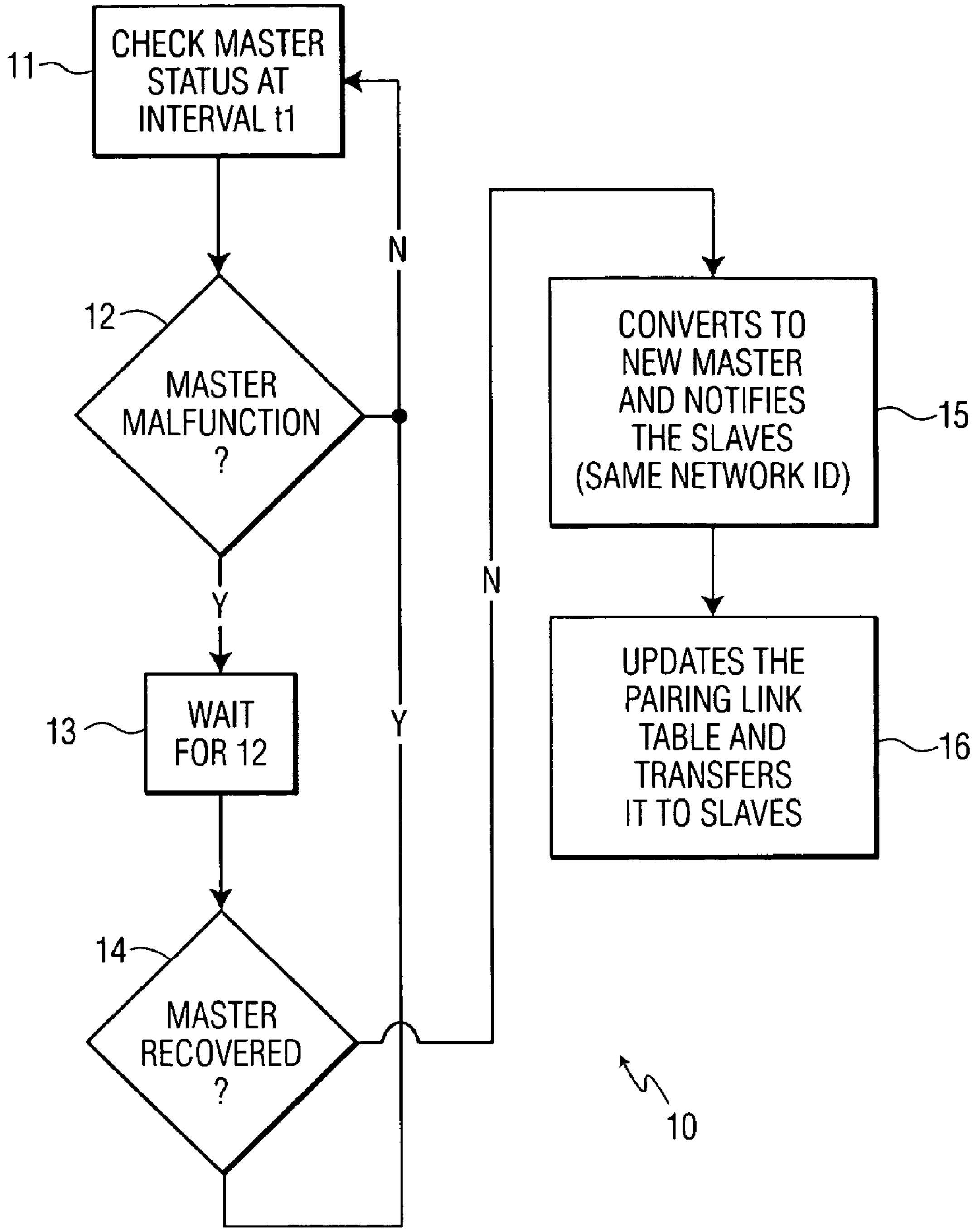
FIG. 1 illustrates a flowchart of the back-up master operation taking over control of the network.

Master and slaves exchange status information at pre-determined intervals to make sure that the master is working properly. The master sends out beacon packets that contains status information at these certain intervals. The slaves receive the beacon packets and determine the state of the master. As illustrated in FIG. 1, at step 11 slaves also wake up a master that is in its sleep mode at intervals $t_1$. Each slave keeps in touch with the master with the same interval but at a different point of time (based on a randomly generated number).

Once a slave finds that the master is not working, at step 13 it waits a certain delay time $t_2$ before taking any action in case the master become operational again. Once the delay is timed out, at step 15 the first slave who discovers the master-failure will start to convert itself to the new master. While the first slave is waiting, the rest of the slaves can find out the master-failure too, but all of them have to wait for the same delay $t_2$ before reacting, so the first to discover the master outage becomes the new master.

The new master switches to the master status using the master code that has already been stored in its memory.

The new master establishes the network using the same network ID that the previous master used, providing this network ID is not used by any other networks in the vicinity. Then the application layer of the master does the following, as shown in FIG. 1.

1. Informs the lower layers in the new master to act as a master (sending beacons . . . ) using the same network ID.
2. At step 15 informs the slaves that a new master is taking over the network and they should synchronize with the new master in terms of listening to the beacons and checking the master's status.
3. At step 16 updates the pairing-link table and transmits a copy of it to all the slaves.

The algorithm of the present invention can be implemented in combination with a wireless communication protocol, either proprietary or open standard to ensure a reliable RF communication such as Zigbee™. Zigbee™ is a low cost, low power consumption, two-way, wireless communications standard aimed initially at automation, toys, & PC peripherals, and is a good candidate for implementing this system and method of the present invention for a recoverable RF wireless lighting control network that uses slaves as backup masters.

Normal Operation

The very first time the system is installed, the master and slaves all take on the physical format of a ballast. In a preferred embodiment, their roles are distinguished by certain mechanisms or algorithms. In a given single room, there must be a master and at least one slave. All the devices, including master and slaves, have nonvolatile memories (NVM) to store the enumeration status information, network ID information and pairing-link table information. When the devices are initially powered up, the master checks its NVM to see if it has been in any network as a master before. If not, it establishes its network using a randomly generated network ID. The slaves check their NVMs to see if they have been in any network as a slave before, if not, they try to enumerate to a master available in their RF vicinity. Once they are connected to a master, the lamp flashes to provide feedback to the user and the user presses a button on the remote control to confirm that it should be included in the network. The remote control is also a slave to this network and has to be connected to the master before the ballasts.

Reasons for Master Failure

There are two major reasons for the master to fail:

1. Power Loss: During normal operation, both master and slave must not be cut off from the main power supply for any reason, as they have to keep the RF communication alive all the time. Turning off the lamps only puts the lamp drivers in stand-by, and it does not shut off the power supply to the circuits. When the ballasts are initially powered up from the main power supply, if a ballast is supposed to be a master, it starts to establish its network. If it is supposed to be a slave, it starts to request joining a network. The ballasts store their IDs and network connection information (such as the pairing-link table, the flag indicating if it has been enumerated before, etc.) in the non-volatile memory so that the network connection can be recovered after a temporary power interruption. If the power of the whole system is consistently interrupted, then the ballasts maintain their previous roles after the power comes back. In this case, the power-up reset does not trigger the enumeration request in the ballast if it was already in a network previously. This scenario is not considered a master failure since the whole network recovers to its previous state before the power interruption without further procedures being invoked.

However, sometimes the master could be installed on a different main power line from the slaves. When its power is experiencing an outage and the one for the slaves is not, a back-up master is needed to keep the rest of the slaves under control.

2. Circuit malfunction: This includes failures in the MCU or transceiver and temporary RF signal blockage/shielding around the master, etc. In this case, a back-up master is also necessary to recover the operation of all the slaves.

Figure 2:
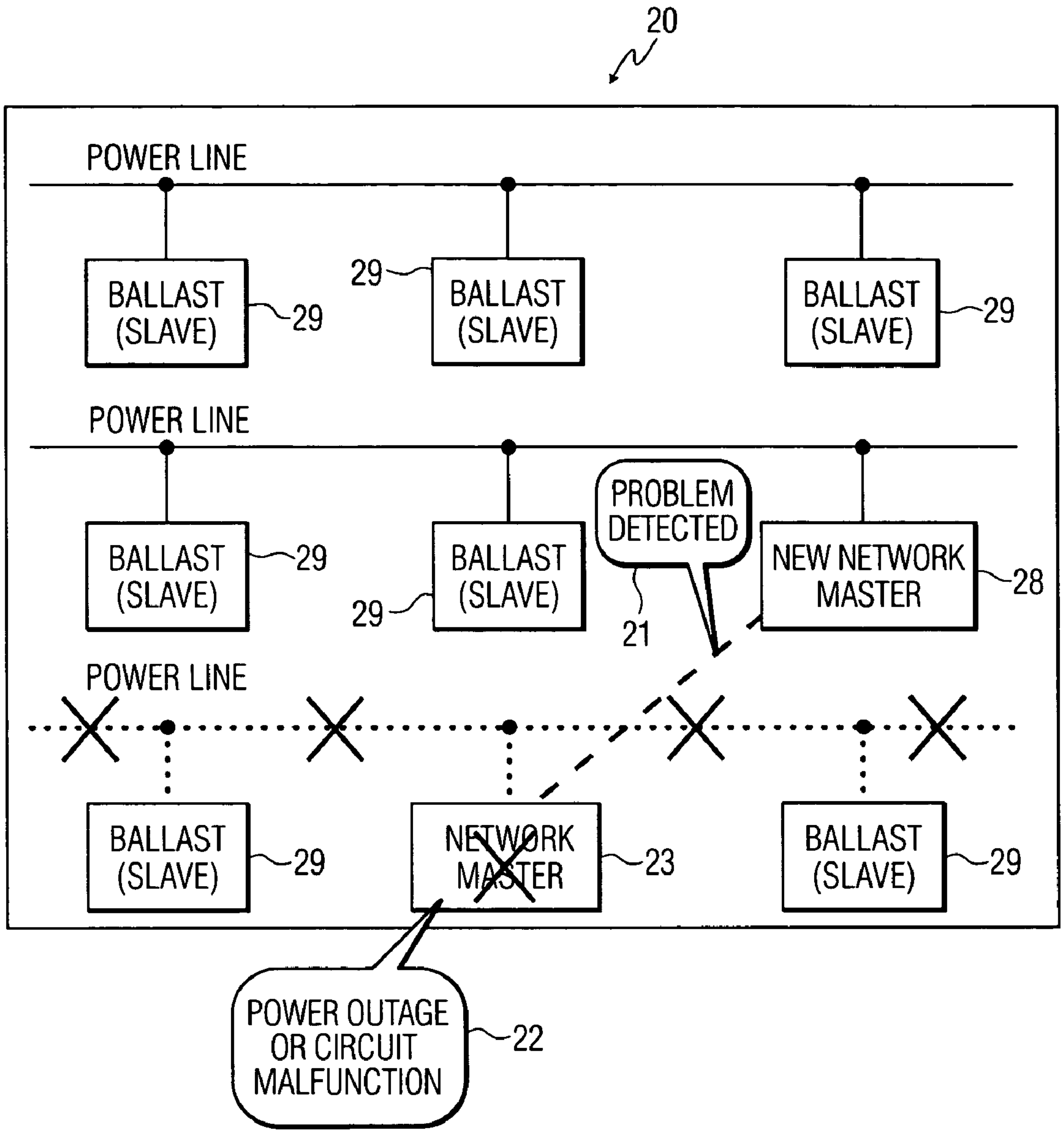
FIG. 2 illustrates the failure of a network master control unit and several slaves of the same wireless lighting network.

FIG. 2 illustrates the master failure situation. If a circuit malfunction occurs and the network master control unit 22 is not functional, a new master control unit 28 takes over control of the existing lighting network by following the algorithm illustrated in FIG. 1. By way of example only, several slaves and a network master control unit 22 are shown in a non-working circuit in FIG. 2. The new network master control unit 28 takes control of the exiting lighting network 20, updates its pairing-link table to reflect these non-working units and transmits the updates to all the working slaves in the network.

Disabled Master Coming Back

In the case that the previous master recovers from its temporary RF blockage or power outage, it tries to join the same network again, but not as a master, instead, as a slave since there a new master has already taken over control of the network. The following describes the two different situations where the previous master recovers from a temporary power outage and RF blockage. If the previous master failure is due to circuit malfunction, it cannot recover anyway.

1. Coming Back from Temporary Power Outage

Figure 3:
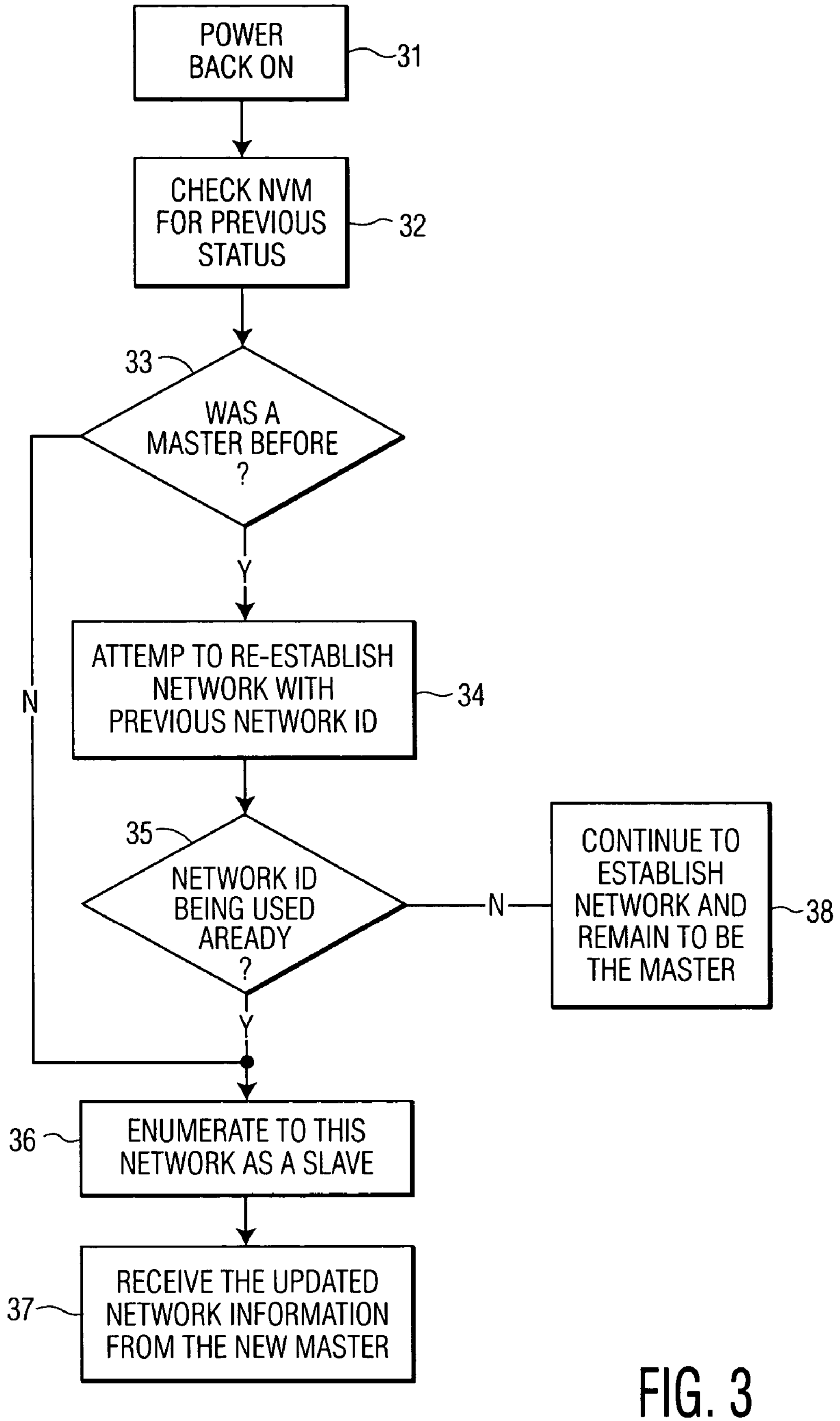
FIG. 3 illustrates recovery of a network master control unit from a power outage.

Referring now to FIG. 3, when the previous master regains power 31, it goes through the power-up reset and then checks the contents of its NVM. When its NVM indicates that it was previously the master of a network 34, it tries to recover its role as master in the same network by attempting to establish its network using the same network ID 34. It starts the search at this particular network identifier, and then listens for a beacon packet to see if anyone else is already using this network ID 35. As soon as it finds out that another device has already taken its place as the master in this particular network (using the previous network ID), it withdraws itself from attempting to become the master again, and it enumerates to the network as a slave 36. Since the network ID is still the same, it does not require any user intervention during the enumeration.

As can be seen in FIG. 3, some of the slaves might have been out of power, as well, if they were on the same power line as the previous master. When they regain power, they go through power-up reset and then check the contents of their NVMs. As their NVMs indicate that they were was previously slaves of a network, they try to recover this role as a the slave 36, in the same network by attempting to enumerate using the previous network ID. The new master is able to accept them without user intervention since the new master has the information that the slave has been in this network before the power was out.

2. Coming Back from Temporary RF Communication Blockage

When the previous master failure is due to the temporary RF communication blockage, the protocol stack is able to report this problem to the application layer. The application layer then goes back to the beginning of the routine, which is power-up reset. Then it keeps trying to re-establish its network using the same network ID 38. If, by the time the RF channel is clear for communication for this device, the new master has already taken over the network, the old master withdraws from trying to become the master, but tries to become a slave, which is the same as the situation in coming back from temporary power outage and is discussed above and illustrated in FIG. 3. If by the time the old master regains RF accessibility, the new master has not yet taken control of the network, the old master recovers control over the same network with the same ID and this is illustrated in FIG. 3.

Although the present invention has been described in relation to particular embodiments thereof, many other variations and modifications and other uses will be apparent to those skilled in the art. The present invention, therefore, should be limited not by the specific disclosure herein, but only by the appended claims.

We claim:

1. A lighting control network recovery system for a wireless network of lighting elements, comprising:

a plurality of ballasts, each ballast of the plurality of ballasts being configurable as one of a slave element and a network master control unit;

wherein one ballast is configured as the network master control unit to control each ballast that is configured as a slave element, and, when the network master control unit is no longer in communcation with one or more of the ballasts, one of the ballasts that is configured as a slave unit is configured to be the network master control unit.

2. The system of claim 1, including:

at least one remote control unit having a plurality of keys; and at least one main power line having the ballasts connected thereto such that:

the one of the ballasts that is configured as the network master control unit is adapted to setup the network configuration of the lighting control network by recording a registration of each association of at least one key of the at least one remote control to at least one of the ballasts to control the at least one ballast thereafter.

3. The system of claim 2, wherein the at least one remote control unit is configured as a slave element that is connected to the network master control unit before any of the plurality of ballasts that are configured as a slave element.

4. The system of claim 2, wherein:

each ballast includes a non-volatile memory, a pairing-link table is stored in the non-volatile memory of the ballast that is configured as the network master control unit to record a registration of each ballast that is configured as a slave element that registers with the network master control unit, and each binding of the ballasts in the pairing-link table with at least one of the plurality of keys of the at least one remote control unit, and the ballast that is configured as the master control unit is configured to transmit the pairing-link table to each other ballast each time the pairing-link table is modified by the network master control unit, for storage in the non-volatile memory of the ballasts.

5. The system of claim 4, wherein:

the ballast that is conficiured as the master control unit is configured to periodically transmit a beacon packet, and the ballasts that are configured as the slave element are configured such that a first ballast that fails to receive the beacon packet:

waits a given delay time, configures itself as the master control unit, using a same network ID and the pairing-link table in its non-volatile memory, and notifies the other ballasts of its reconfiguration as the master control unit.

6. The system of claim 2, wherein the ballast that is configured as the network master control unit is configured to:

determine whether an other ballast has become configured as the master control unit, and to configure itself as a slave element and register with the other ballast if the other ballast has been configured as the master control unit, determine whether network communications have been lost and reestablishing the network if the other ballast has not been configured as the master control unit.

7. The system of claim 6, wherein the system is implemented using a low power consumption, two-way wireless communication standard having a protocol and comprising a radio, a physical layer, a data link layer, and an application layer.

8. The system of claim 7, wherein the two-way wireless communication standard is Zigbee™ and the protocol is Protocol for Universal Radio Link (PURL).

9. The system of claim 6, wherein the ballast that is configured as the network master control unit determines whether the other ballast has become configured as the master control unit each time the ballast is powered on.

10. The system of claim 1, wherein the ballasts that are configured as slave elements are configured to transmit wake-up calls to the ballast that is configured as the network master control unit.

11. A method for recovery control of a wireless lighting control network in which a master ballast is configured to facilitate communication of commands from a plurality of control elements to a plurality of ballasts based on a pairing-link table that includes a plurality of associations between control elements and ballasts in the network, comprising:

communicating the pairing-link table from the master ballast to each of a plurality of slave ballasts, monitoring, at each of a plurality of slave ballasts in the network, for an indication that a master ballast is present in the network, and if a first slave ballast of the plurality of slave ballasts fails to receive the indication within a given period of time, configuring the first slave ballast to become a new master ballast in the network, and facilitating communication of commands from the control elements to the ballasts via the new master ballast, based on the pairing-link table previously received by the new master ballast.

12. The method of claim 11, wherein the control elements include keys of at least one remote control unit:

configuring the lighting control network by:

registering each slave ballast with the master ballast, and associating each registered slave ballast with at least one of the keys; and controlling the lighting control network by the keys, via the master ballast.

13. The method of claim 12, including registering the at least one remote control unit as a slave element with the master ballast before registering each slave ballast.

14. The method of claim 12, including:

initializing the pairing-link table at the master ballast as empty;

enumerating each slave ballast that registers with the master ballast in the pairing-link table of the network master control unit;

associating each slave element enumerated in the pairing-link table with at least one of the keys.

15. The method of claim 14, wherein the configuring of the first slave ballast to become the new master ballast includes:

when a master code is already stored in the memory of the new master ballast, establishing a network with the same network ID that the master ballast had used;

informing each slave ballast to monitor for an indication that the new master ballast is present on the network;

updating the pairing-link table of the new master ballast; and transmitting the updated pairing-link table to each slave ballast.

16. The method of claim 12, including, on power-up reset:

at the master ballast:

determining whether the network has been established, and if the network has not been established, establishing the network;

otherwise, if the network had previously been established determining whether the network is already in use, and if the network is already in use, enumerating the ballast as a slave element to a new master ballast;

otherwise, if the network had been established but is not already in use, reestablishing the network based on its stored pairing-link table; and at each slave ballast:

determining whether the network has been established, and if the network has not been established, reconfiguring itself to become a master ballast and establishing the network;

otherwise rejoining the network.

17. A system with a low power consumption, two-way wireless communication standard having a protocol and comprising a radio, a physical layer, a data link layer, and an application layer that performs the method of claim 16.

18. The system of claim 17, wherein the two-way wireless communication standard is Zigbee™ and the protocol is Protocol for Universal Radio Link (PURL).

19. The method of claim 16, wherein determining whether the network has been established is based on whether a network identifier is stored at the ballast.

20. The method of claim 12, including transmitting wakeup calls from the slave ballasts to the master ballast.

* * * * *